Nov. 14, 1967  A. W. ANDERSON ET AL  3,352,714
POLYFLUOROCARBON SUBSTRATE COATED WITH POLYAMIDE AND METHOD
Filed March 13, 1961

```
┌─────────────────────────────────────────────────┐
│ A POLYFLUOROCARBON SUBSTRATE TO BE MADE ABRASION│
│             AND CUT-THROUGH RESISTANT           │
└─────────────────────────────────────────────────┘
                         │
┌─────────────────────────────────────────────────┐
│ SURFACE ACTIVATED BY ETCHING, EITHER BY SUBJECTING│
│  TO A CORONA DISCHARGE TREATMENT OR BY CONTACTING│
│       WITH AN ALKALI-METAL ETCHING REAGENT      │
└─────────────────────────────────────────────────┘
                         │
┌─────────────────────────────────────────────────┐
│  ACTIVATED POLYFLUOROCARBON SURFACE CONTACTED WITH│
│           A POLYAMIDE ACID SOLUTION             │
└─────────────────────────────────────────────────┘
                         │
┌─────────────────────────────────────────────────┐
│ POLYAMIDE ACID WHICH IS RETAINED ON ACTIVATED POLY-│
│  FLUOROCARBON SURFACE CONVERTED TO POLYIMIDE BY A│
│           THERMAL OR CHEMICAL TREATMENT         │
└─────────────────────────────────────────────────┘
```

INVENTORS
ARTHUR WILLIAM ANDERSON
LOWELL RAY PERKINS

BY *Frank R. ...*
ATTORNEY

United States Patent Office 3,352,714
Patented Nov. 14, 1967

3,352,714
POLYFLUOROCARBON SUBSTRATE COATED
WITH POLYAMIDE AND METHOD
Arthur William Anderson, Wilmington, and Lowell Ray Perkins, Newark, Del., assignors to E. I. du Pont de Nemours and Company, Wilmington, Del., a corporation of Delaware
Filed Mar. 13, 1961, Ser. No. 95,019
The portion of the term of the patent subsequent to Apr. 20, 1982, has been disclaimed
29 Claims. (Cl. 117—213)

This invention relates to the preparation of compositions which show unusual heat, abrasion and cut-through resistance and more particularly it relates to the preparation of compositions comprised of polyfluorocarbons and polyimides.

Polyfluorocarbons are well known for their unusually superior thermal and electrical properties, the result being that they are quite useful in electrical applications, such as wire coatings, requiring good insulation over a broad temperature range. Examples of such polyfluorocarbons which are referred to above include polytetrafluoroethylene, polyhexafluoropropylene, polychlorotrifluoroethylene, polyvinyl fluoride, polyvinylidene fluoride, copolymers of tetrafluoroethylene and hexafluoropropylene, and the like. Although these polymers are extremely useful for the many applications which cannot be filled through the use of other materials, their usefulness may be enhanced by altering certain undesirable characteristics. One shortcoming of these polymers is that their abrasion and cut-through resistance, for some applications, is deficient. It would appear relatively simple to select a second material which would eliminate or minimize these undesirable characteristics if applied, for example, as an overlayer or if admixed with the polyfluorocarbon resin. Unfortunately, due to the characteristics of the polyfluorocarbons such an admixture or overlayer either cannot be produced satisfactorily, or does not withstand the "in use" conditions encountered in the particular application. The former difficulty usually is recognized as being related to the chemical inertness of the polyfluorocarbon, a factor which makes adhesion thereto quite difficult. Where the lack of adherability has been overcome, it frequently has been through the use of nonfluorocarbon materials which cannot withstand the "in use" conditions so that, once again, the adhesion is ultimately lost, or through the use of extraneous materials which are deleterious to the particular polyfluorocarbon use, e.g. the use of metal-derived adhesives in electrical applications.

It is the principal object of this invention, therefore, to provide a composition which not only retains the desirable characteristics inherent in the fluorocarbon resins but which, furthermore, has markedly increased resistance to abrasion and cut-through. It is a secondary object of this invention to provide this improvement using a procedure which is commercially feasible and which can be integrated, if desired, with present methods for fabrication of the polyfluorocarbon resins in their particular applications. Other objects will become apparent hereinafter.

The attached drawing is a simplified flow diagram indicating a preparation of the new composite structures of the present invention.

The objects of the present invention are best realized by providing the prefabricated polyfluorocarbon article with a polyimide coating. The polyimide consists essentially of recurring units having the following structural formula:

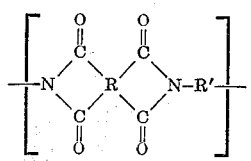

wherein R is a tetravalent radical containing at least two carbon atoms, with no more than two carbonyl groups being attached to any one carbon atom of said tetravalent radical, such as

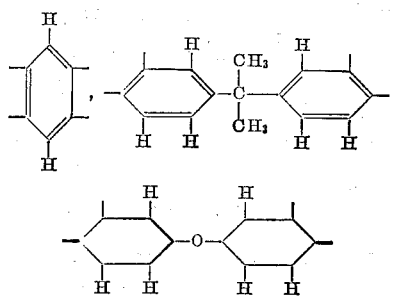

and the like, and R' is a divalent radical containing at least two carbon atoms, with no more than one free valence bond of the divalent radical being situated on any one carbon atom such as biphenyl-4,4'-ylene, 2,2-bis (phenyl-4-yl)propane, bis(phenyl - 4 - yl)methane, bis (phenyl-4-yl)ether, 4,4-dimethylheptamethylene and the like. A detailed discussion of the properties and preparation of polyimides may be found in copending applications S.N. 761,968, S.N. 803,347, S.N. 803,348 and S.N. 803,349, all of the foregoing applications having been refiled and now existing as U.S. Patents Nos. 3,179,614, 3,179,634, 3,179,630 and 3,179,633, respectively. Polyimides may be formed from polyamide acids having the structure:

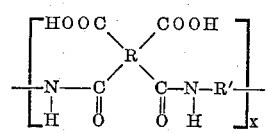

wherein $x$ is an integer which is sufficiently large to impart the necessary inherent viscosity as subsequently defined, and which in practice is usually greater than twenty, and wherein R and R' are the same as above. The conversion of polyamide acid to polyimide with concurrent loss of water may be carried out either thermally or chemically, or by combinations of the two. The thermal treatment involves heating to above 50° C. for a given time, while the chemical method may be carried out as described in the copending applications supra, using for example, acetic anhydride and pyridine. The chemical method is especially suitable when using polyfluorocarbons which have lower melting temperatures, e.g. those melting in the 200–250° C. region.

The preferred method for applying the polyamide acid precursor of the polyimide to the polyfluorocarbon substrate is by means of a solution coating process. The details of the process will vary with the object being coated, but basically the method involves treating the object with a solution of the polyamide acid. The solvent normally employed in the solution is an organic polar solvent and is selected from the N,N-dialkylcarboxylamide class, and preferably the lower molecular weight members of this class. Examples of this type include N,N-dimethylformamide, N,N-dimethylacetamide, N,N-diethylformamide, N,N-diethylacetamide, N,N-dimethylmethoxyacetamide, and the like. Other organic polar solvents not of the above type can be useful in this process, however, and include as examples N-methyl-2-pyrrolidone, pyridine, tetramethylene cyclic sulfone and hexamethylphosphoramide. Combinations of the above solvents can be used and combinations of the above with poor or non-solvents also are satisfactory. After the polyfluorocarbon object is coated with a solution of polyamide acid, the solvent is evaporated and the conversion to polyimide is completed, chemically or thermally, or by a combination of the two. If the chemical method is employed, it is advantageous to eliminate the preliminary solvent evaporation to facilitate interaction of the polyamide acid and the dehydrating agent.

The polyamide acid used in this invention has an inherent viscosity of at least 0.1, preferably 0.3–5, for 0.5% solution at 30° C. in N,N-dimethylacetamide. The polyamide acid, however, may contain some polyimide before application to the polyfluorocarbon, but the amount of polyimide must be less than 50% of the mixture of polyamide acid and polyimide. The conversion of polyamide acid to polyimide is effected by heating between 50° and 350° C. for a period of a few seconds to several hours depending upon the concentration of the polyamide acid solution, the rate of coating desired, the type of polyamide acid used and the type of polyfluorocarbon being coated. It is preferred to have gradual temperature increases up to and within the conversion range in order to minimize the tendency for the evolved water vapor to form voids or bubbles and to avoid crystallization or embrittlement. It also has been found that if the polyamide acid has been converted to polyimide at less than 300° C., an improvement in the thermal and hydrolytic stabilities of the polyimide may be effected by heating between 250–500° C. for from fifteen seconds to two hours.

The polyamide acid also may be converted to the polyimide as indicated hereinabove by chemical methods, melting points as low as 200–250° C. The coated polyfluorocarbon may be treated by steeping for a time, usually less than 24 hours, in a bath containing acetic anhydride or preferably acetic anhydride and pyridine. The chemical process may be carried out in a similar fashion using a carbodiimide, for example, dicyclohexylcarbodiimide, as the dehydrating agent. If desired, combinations of the thermal and chemical methods frequently may be used to advantage.

The polyamide acids which are employed as precursors of the polyimides may be selected from a wide variety of materials. They best may be identified by the tetracarboxylic acid dianhydrides and the organic diamines from which they are prepared. The organic diamines, represented by $H_2N-R'-NH_2$ wherein the R' is a divalent radical containing at least two carbon atoms, with no more than one free valence bond of the divalent radical being situated on any one carbon atom, may be selected from the following groups: aromatic, aliphatic, cycloaliphatic, combinations of aromatic and aliphatic, aliphatic and cycloaliphatic, and substituted groups thereof. R' of $H_2N-R'-NH_2$ preferably may be represented as a divalent radical selected from the group consisting of

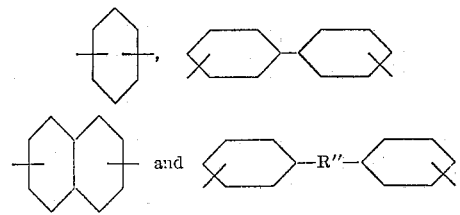

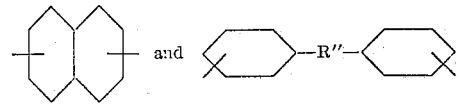

where the ringes are either saturated or benzenoid or partially saturated and partially unsaturated, and where R'' is selected from the group of elements consisting of carbon, silicon, nitrogen, phosphorus, oxygen and sulfur. The preferred R' groups in the diamines are those containing at least 6 carbon atoms and which contain benzenoid unsaturation. Among the diamines which are suitable for use in the present invention are: meta-phenylenediamine, para - phenylenediamine; 2,2 - bis(4,4' - diaminodiphenyl)propane; 4,4'-diaminodiphenylmethane; benzidine; 4,4' - diaminodiphenyl sulfide; 4,4' - diaminodiphenyl sulfone; 3-3' - diaminodiphenyl sulfone; 4,4'-diaminodiphenyl ether; 1,5 - diaminonaphthalene; 3,3'-dimethyl - 4,4' - diaminobiphenyl; 3,3' - dimethoxybenzidine; 2,4 - bis(beta - amino - t - butyl)toluene; bis(para - beta - amino - t - butylphenyl)ether; para-bis(2 - methyl - 4 - aminopentyl)benzene; para - bis (1,1-dimethyl - 5 - aminopentyl)benzene; m - xylylenediamine; p - xylylenediamine; bis(para - aminocyclohexyl)methane; hexamethylenediamine; heptamethylenediamine; octamethylenediamine; nonamethylenediamine; decamethylenediamine; 3 - methylheptamethylenediamine; 4,4 - dimethylheptamethylenediamine; 2,11 - diaminododecane; 1,2 - bis(3 - aminopropoxy)ethane; 2,2 - dimethyltrimethylenediamine; 3 - methoxyhexamethylenediamine; 2,5 - dimethylhexamethylenediamine; 2,5 - dimethylheptamethylenediamine; 5 - methylnonamethylenediamine; 1,4 - diaminocyclohexane; $H_2N(CH_2)_3O(CH_2)_2O(CH_2)_2NH_2$; $H_2N(CH_2)_3S(CH_2)_3NH_2$;

$$H_2N(CH_2)_3N(CH_3)(CH_2)_3NH_2$$

and mixtures thereof.

The tetracarboxylic acid dianhydrides are identified by the following formula:

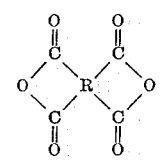

wherein R is a tetravalent radical containing at least two carbon atoms, with no more than two carbonyl groups being attached to any one carbon atom of said tetravalent radical, and which is selected from the group consisting of aromatic, aliphatic, cycloaliphatic, combinations of aromatic and aliphatic, and substituted groups thereof. However, the preferred dianhydrides are those in which the R group has at least six carbon atoms and contains benzenoid unsaturation, with each of the four carbonyl groups being attached to separate carbon atoms of the tetravalent radical and more particularly, with each carbonyl group of a given pair being attached to adjacent carbon atoms in the R group to provide a 5-membered ring as follows:

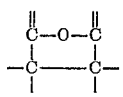

Illustrations of dianhydrides suitable for use in the present invention include: pyromellitic dianhydride, 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3' - biphenyltetracarboxylic dianhydride, 2,2 - bis(3,4 - dicarboxyphenyl)propane dianhydride, bis(3,4-dicarboxyphenyl)sulfone dianhydride, 3, 4,9,10-perylenetetracarboxylic dianhydride, bis(3,4-dicarboxyphenyl)ether dianhydride, ethylene tetracarboxylic dianhydride, etc.

In order to form the desired polyimide-coated polyfluorocarbon having outstanding thermal properties as well as superior abrasion and cut-through resistance, it is necessary to pretreat the polyfluorocarbon surface, hereinafter called "surface activated," before exposing to the polyamide acid. Although the mechanism is not known, the pretreatment effects some sort of chemical or physical etching, or both, of the polyfluorocarbon surface to provide a strong bond between the substrate and the polyamide acid and/or the polyimide coating. One method by which the above can be effected is by means of an alkali-metal, and particularly sodium, etching reagent. This type of reagent is available commercially, and includes, for example, sodium in liquid ammonia or sodium in naphthalene.

The usually preferred method of "surface activation" of the polyfluorocarbon is by means of an electric discharge such as a corona discharge, especially when the surface is a tetrafluoroethylene-hexafluoropropylene copolymer containing at least 5 weight percent hexafluoropropylene units. The actual process of the corona treatment can be varied broadly. Such treatment is continued for a period of time sufficient to modify the surface characteristics of the polyfluorocarbon. It is understood that a corona discharge is not necessarily visible to the eye, and accordingly it may be defined as any electrically detectable, field-intensified ionization that does not result immediately in complete breakdown of the insulation-electrode system in which the ionization occurs. A discharge that produces an arc or spark is, therefore, precluded under such a definition. In practice, the degree of corona treatment is determined by trial based on physical testing of the polyfluorocarbon-polyimide specimen. The pressure of the atmosphere in which the corona discharge is formed is not critical, although lower pressures generally permit the production of corona discharges at a lower voltage. The sample of polyfluorocarbon to be treated is placed between two electrodes spaced sufficiently apart to provide a gap between the surface to be laminated and the electrode, the voltage applied usually being at least 500 volts. The atmosphere present during the corona discharge treatment may be any gas in which a corona discharge can be produced.

The particular polyfluorocarbon substrate useful in this invention may be any of the normally solid fluorocarbon polymers. It generally has been found that the molecular weight of the solid fluorocarbon polymers should exceed 1000 and that the polymer should be prepared from monomers containing from two to ten carbon atoms. Examples of these include polytetrafluoroethylene, polyhexafluoropropylene, polychlorotrifluoroethylene, polyvinyl fluoride, polyvinylidene fluoride, copolymers of tetrafluoroethylene and hexafluoropropylene, and the like. Polyfluorocarbons containing oxygen atoms, e.g. the ethers, likewise are useful in this invention. The polymers of the perfluoroalkyl perfluorovinyl ethers, such as perfluoromethyl perfluorovinyl ether and perfluoropropyl perfluorovinyl ether, may be used as the polyfluorocarbon. The most satisfactory substrates are the copolymers which are prepared from tetrafluoroethylene and hexafluoropropylene and which contain at least 5 weight percent hexafluoropropylene units, especially when the corona discharge pretreatment is utilized. When it is desirable to coat a polytetrafluoroethylene surface using the corona pretreatment, it is preferable to first coat the polyfluorocarbon surface with a very thin layer of a copolymer of tetrafluoroethylene and hexafluoropropylene containing at least 5 weight percent hexafluoropropylene units. The thinness of this layer may be characterized as that which will not interfere with the use of the final product at temperatures above the melting point of the copolymer.

The combination of a "surface activated" polyfluorocarbon and a polyimide is particularly useful as a wire coating. The following examples are given to illustrate this application and are not intended to limit the invention in any way, since many other illustrations could be given, such as where the combination is utilized in film, tubing, pipe and the like.

EXAMPLE I 0.030 inch copper wire which is coated first with a 0.010 inch insulation of polytetrafluoroethylene and then a 0.0001 inch layer of a tetrafluoroethylene-hexafluoropropylene copolymer, followed by a corona treatment, is passed at room temperature through a 17 weight percent solution of a polyamide acid in N,N-dimethylacetamide, said polyamide acid having a structure consisting of at least 20 recurring units of the following:

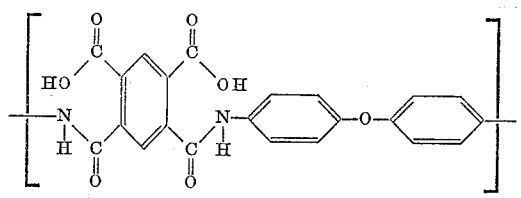

at a rate of 10–15 ft./min. The solution coated wire passes into a 12 ft. tower whose temperature profile varies from just above room temperature to about 120° C. at the entrance, to 250–350° C. at the exit. Herein the polyamide acid is freed of solvent and converted to polyimide, the one above being (DPS–PI) and the wire coming from the exit is collected on a suitable take-up assembly or spool. By controlling the speed of the wire and the concentration of the polyamide acid solution any thickness of polyimide coating up to about 0.001 inch may be achieved. Although thicker coatings are preferably applied by multiple coating operations because of the tendency for thick sections of the polyamide acid to bubble during dehydration due to the rapid heating required to dehydrate the sample quickly at the wire speed desired, this seldom is necessary since only thin coatings are required to impact the outstanding abrasion, cut-through and corona resistance.

EXAMPLE II

The basic procedure of Example I is repeated except that a polytetrafluoroethylene coated copper wire is given a preliminary etch using sodium in naphthalene instead of being submitted to corona discharge treatment after coating with copolymer. The properties of the products prepared according to the procedure of the above two examples are shown in the following table along with those of a control sample of polytetrafluoroethylene coated wire. Note that the usefulness of the duplex composition in film form is verified by the measurement of the corona resistance which requires a film sample.

PROPERTIES OF POLYFLUOROCARBON-POLYIMIDE LAYERED COMPOSITIONS

| Property | Test Employed | Conditions | 0.001″ (DPE-PI) Coating Applied Over Sodium Etched Polytetrafluoroethylene | 0.0005″ (DPE-PI) Coating Applied Over Corona Treated Polytetrafluoroethylene [1] | Control Sample of Polytetrafluoroethylene |
|---|---|---|---|---|---|
| Cut-through resistance | Standard U/L Test Apparatus | Constant 10 kg. Load, 1/16″ knife radius, ambient conditions. | Over 24 hours | Over 24 hours | Immediate failure. |
|  | Proposed U/L Test | Constant 1 kg. load, 0.003″ knife radius, 250° C. | Over 1¼ hours |  | ½ to 5 mins. |
|  | do | Constant 1 kg. load, 0.003″ knife radius, 300° C. | Over 1 hour |  | 1 to 3 mins. |
|  | Modified Standard U/L Test | Same as above except start at 5 kg. load and add 5 kg. every 30 secs. until failure occurs. | 106 to 350 secs | 105 to 205 secs | 30 secs. |
| Abrasion resistance | NAS 703, 4.3.11 (National Aircraft Standards Committee, 1953). | ½ lb. load, ambient conditions (6,600 ohms auxiliary resistance). | 80 inches | 80 inches | 68 inches. |
|  | G. E. Repeated Scrape Abrasion Tester. | 500 g. load, square-edged blade 0.025″ thick, ambient conditions. | 8 scrapes | 8 scrapes | 4 scrapes. |
| Cold bend | NAS 703, 4.3.7 | Include specification on minimum dielectric strength after exposure. | Passes | Passes | Passes. |
| Hydrolytic stability |  | 24 hours exposure to boiling water (1 atm.). | No apparent effect. | No apparent effect. | No apparent effect. |
| Flame resistance | U/L Vertical Flame Test |  | Passes | Passes | Passes. |
| Dielectric constant | ASTM D-150-54T [2] | 10$^3$ c.p.s. ambient conditions | 1.9–2.0 | 1.9–2.0 | 1.9–2.0. |
|  |  | 10$^6$ c.p.s. | 1.9–2.0 | 1.9–2.0 | 1.9–2.0. |
| Dissipation factor | ASTM D-150-54T [2] | 10$^3$ c.p.s. ambient conditions | 0.0004–0.0005 | 0.0004–0.0005 | 0.0004. |
|  |  | 10$^6$ c.p.s. | 0.006 | 0.006 | 0.005. |
| Dielectric strength | ASTM D-149-59 [2] | 60 c.p.s. voltage rise rate-500 volts/sec. | 1,100 volts/mil | 1,050 volts/mil | 1,150 volts/mil. |
| Insulation resistance | ASTM D-257-58 [2] | 250 v. (DC), 25° C., after 96 hours at 95% relative humidity, resistance measured between points on wire 1″ apart. | >10$^9$ ohms | >10$^9$ ohms | >10$^9$ ohms. |
| Corona resistance | Using method described in Trans. A.I.E.E. 58-191, Paper #593 (1959) [3]. |  | 157 hours |  | 54 hours. |

[1] Polytetrafluoroethylene precoated with 0.0001″ layer of tetrafluoroethylenehexafluoropropylene copolymer.
[2] Electrode System modified to permit direct measurements on insulated wire.
[3] Measured on .005″ thick, unstressed film of polytetrafluoroethylene having a (DPE-PI) coating 0.0002″ thick; no (DPE-PI) coating on control sample.

EXAMPLE III

A procedure similar to that described in Example I is used to coat a polychlorotrifluoroethylene insulated wire with polyamide acid. The solution coated material is held up in a mixture of acetic anhydride and pyridine to chemically convert the polyamide acid to polyimide. The wire is then passed through the furnace having a maximum temperature of 250° C. at the exit, because of the lower melting point of the polyfluorocarbon resin used, to complete the cure of polyamide acid to polyimide and to remove the solvent.

EXAMPLE IV

Example III is repeated except that the wire being coated is insulated with polyhexafluoropropylene. Because of the lower melting point of this resin the polyimide is formed by a combination of the thermal and chemical methods, as above.

EXAMPLE V

Example I is repeated except that the wire being coated is insulated with a copolymer of tetrafluoroethylene and hexafluoropropylene containing at least 5 weight percent hexafluoropropylene units, the copolymer coating step being eliminated.

EXAMPLE VI

Example I is repeated essentially as shown except that the polyamide acid has a structure which consists of at least 20 recurring units of the following:

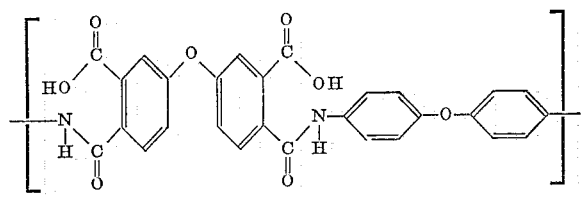

The properties are similar to those shown in the above table.

The following examples are given to demonstrate the processes of polyfluorocarbon pretreatment and also the chemical conversion of polyamide acid to polyimide.

EXAMPLE VII

A 0.030 inch copper wire which is coated with a 0.010 inch insulation of polytetrafluoroethylene is passed at ambient temperature through a solution of liquid ammonia containing 1 weight percent sodium. To prevent deactivation of the sodium, the solution is protected by an inert atmosphere, such as nitrogen, although the evolution of the ammonia itself assists in the exclusion of moisture and oxygen. The contact time of the polyfluorocarbon and the sodium in liquid ammonia is one second. Upon completion of this etching, the treated polyfluorocarbon is quenched in water, dried and then passed into the polyamide acid solution and finished off as described in Example I. The concentration of sodium in liquid ammonia is not critical and may be varied from the 1 weight percent level, but it is usually held between 0.25 and 2.5 weight percent. When so doing, however, the contact time with the polyfluorocarbon will vary in the inverse direction of the change in concentration of the sodium in liquid ammonia. There is little to be gained by increasing the sodium concentration above 1%, however, as a contact time of one second is about as low as desirable in most commercial applications.

EXAMPLE VIII

Two grams of metallic sodium are added to 100 cc. dry toluene in a round bottom flask equipped with a heating mantle and a high speed stirrer. The mixer is blanketed with nitrogen and heated to 100° C. at which temperature the stirrer is stated to produce a finely dispersed suspension of the sodium. The mixture is cooled to room temperature, maintaining stirring until below the melting point of the sodium. After the metal is allowed to settle, most of the toluene is sucked off and replaced with 200 cc. dry tetrahydrofuran. 11.14 grams sublimed naphtahlene are added and slow stirring is maintained for one hour at ambient temperature. A 0.030 inch copper wire which is coated with a 0.010 inch insulation of polytetrafluoroethylene is passed through this 15 weight percent solution of sodium in naphthalene (equimolar portions of sodium and naphthalene) at room temperature to about 50° C. under protection of a nitrogen blanket using a contact time of 15–30 seconds. After emergence from the etching bath the treated polyfluorocarbon is quenched in methanol, then washed with acetone and dried before passing through the polyamide acid solution as noted in Example I. The quench treatment following the etching may be carried out with water as in Example VII, but it is preferable to use organic solvents to ensure complete removal of the naphthalene residue.

EXAMPLE IX

A 0.030 inch, 7-stranded, silver-plated copper conductor which is coated with a 0.010 inch insulation of polytetrafluoroethylene is fed from a pay-out reel through a one liter, stainless steel beaker containing, at room temperature, 400 cc. of an aqueous dispersion of a tetrafluoroethylene-hexafluoropropylene copolymer, the copolymer containing at least 5 weight percent hexafluoropropylene units. The aqueous dispersion contains 35 weight percent copolymer solids having an average particle size of about 0.2 micron, 0.8 weight percent (based on solids) ammonium perfluorocaprylate dispersing agent, and 4 weight percent (based on solids) "Triton" X–100 wetting agent. Other wetting agents may be employed although the preferred agent, the one represented, is an isooctylphenyl polyethylene oxide containing 9 or 10 ethylene oxide units per molecule. The polyfluorocarbon coated wire is passed through this solution at a rate of 5–10 ft./min., thence drawn through a 12 ft. x 3 in. I.D. vertical furnace whose temperature varies from 100° C at the entrance, to 375° C. at the exit, and finally collected on a take-up reel. By this means, a 0.0001–0.00015 inch copolymer coating is applied over the polytetrafluoroethylene insulated wire. The thickness of the copolymer coating is such that after etching and bonding with the polyimide, no loss in adhesion is observed even when the final product is used at temperatures which exceed the normal melting temperature of the copolymer. The copolymer coated polytetrafluoroethylene insulated wire as prepared above may then be treated by a corona discharge and finished off as in Example I.

EXAMPLE X

The present experiment utilizes a 0.030" copper wire such as described in Example IX, and which is coated either with a tetrafluoroethylene-hexafluoropropylene copolymer containing at least 5 weight percent hexafluoropropylene units or any other polyfluorocarbon which in turn has been coated with a thin layer of copolymer as described in Example IX. The above wire is fed from a pay-out reel into a corona treatment chamber which may be described as follows:

A 5 ft. x 2 ft. x 2 ft. sheet steel chamber is fitted with a glass tube 4 ft. x 4 in. and having a wall thickness of ³⁄₃₂ in. The tube is mounted on a wooden stand-off insulator support after being sheathed to within 1 in. of each end with 0.005 inch lead foil. The lead foil is connected via a high tension cable out through the side of the steel chamber to a high frequency generator. The steel chamber along with the reels employed for dispensing and collecting the insulated wire and all other metal parts of the apparatus are commonly grounded and connected to the return ground connection on the high frequency generator. The one used in the instant case is a Model HFSG2 high frequency generator manufactured by Lepel High Frequency Laboratories, New York. This generator develops a 500 kilocycle, high voltage, A.C. signal with an adjustable power output from 100 to 1500 watts. The voltage necessary may be defined as that which is required to achieve a corona discharge under the conditions outlined herein and which particularly is dependent upon the atmosphere in which the corona treatment is carried out. The voltage usually employed is greater than 500 volts. Prior to operation of the generator, the coated wire to be treated is threaded through an insulated bushing at one end of the chamber, thence through the glass tube and out the other end of the chamber through an insulated bushing, thence to a take-up assembly. Each end of the chamber is equipped with fittings which permit the ingress and egress of any desirable gas in which the corona treatment may be carried out, in this example, nitrogen. By proper control, the treatment may be carried out under slight positive pressure, atmospheric pressure, or reduced pressure. As indicated supra, the reduced pressure generally permits the formation of a corona discharge at a lower voltage. During the corona treatment the coated wire is passed through this chamber at a rate of 25–250 ft./min. and preferably at about 50 ft./min. At these rates the minimum power setting on the generator is adequate for effecting the treatment. After being treated in this manner the wire is then passed through the polyamide solution and finished off as described in Example I.

EXAMPLE XI

The instant example is given to illustrate the chemical method of conversion of polyamide acid to polyimide although the details are more adequately described in the aforementioned copending applications. The treated polyfluorocarbon coated wire as prepared by any of the foregoing examples is passed through a solution of polyamide acid, e.g. a 17 weight percent solution of a polyamide acid in N,N-dimethylacetamide. While still wet with this solution, the wire is run at room temperature into a bath containing equal volumes of acetic anhydride and pyridine. The wire speed, pulley-assembly and tank dimensions are such that a hold-up of one minute is achieved. Steeping also may be accelerated or slowed down by alteration of bath temperature or acetic anhydride the pyridine ratio. Without pyridine the dehydration may require up to 24 hours, whereas by reducing the ratio below one the reaction can be completed in less than one minute. For commercial feasibility it is desirable to keep the hold-up time to two minutes or less. After exiting from the steeping bath the coated wire is then passed into the 12 ft. x 3 in. vertical furnace whose temperature is controlled as in Examples I or III, depending upon the melting point of the materials used, so as to remove volatiles and complete the conversion of polyamide acid to polyimide.

We claim:
1. A duplex layered composite structure comprising a normally solid surface activated polyfluorocarbon and having directly bonded thereto a polyimide having at least twenty recurring units of the structure:

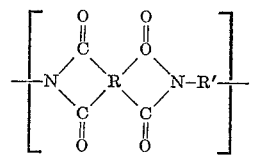

wherein R is a tetravalent radical containing at least two carbon atoms, with no more than two carbonyl groups being attached to any one carbon atom of said tetravalent radical, and R' is a divalent radical containing at least two carbon atoms with no more than one free valence bond of the divalent radical being situated on any one carbon atom.

2. A composite structure of claim 1 wherein R is a tetravalent radical containing at least two carbon atoms, with no more than two carbonyl groups being attached to any one carbon atom of said tetravalent radical, and which is selected from the group consisting of aromatic, aliphatic, cycloaliphatic, combinations of aromatic and aliphatic and substituted groups thereof.

3. A composite structure of claim 1 wherein R is a tetravalent radical having at least six carbon atoms and is characterized by benzenoid unsaturation, with each carbonyl group of a given pair of carbonyl groups in the recurring unit being attached to adjacent carbon atoms in the tetravalent radical so that a five membered ring is formed.

4. A composite structure of claim 1 wherein R' is a divalent radical containing at least two carbon atoms, with no more than one free valence bond of the divalent radical being situated on any one carbon atom, and which is selected from the group consisting of aromatic, aliphatic, cycloaliphatic, combinations of aromatic and aliphatic, cycloaliphatic and aliphatic and substituted groups thereof.

5. A composite structure of claim 1 wherein the normally solid surface activated polyfluorocarbon is prepared from a monomer containing from two to ten carbon atoms.

6. A composite structure of claim 1 wherein the normally solid surface activated polyfluorocarbon is surface activated polytetrafluoroethylene.

7. A composite structure of claim 1 wherein the normally solid surface activated polyfluorocarbon is surface activated polyhexafluoropropylene.

8. A composite structure of claim 1 wherein the normally solid surface activated polyfluorocarbon is surface activated polychlorotrifluoroethylene.

9. A composite structure of claim 1 wherein the normally solid surface activated polyfluorocarbon is a surface activated copolymer of tetrafluoroethylene and hexafluoropropylene containing at least 5 weight percent hexafluoropropylene units.

10. A product comprising a wire which is coated with the composite structure of claim 1, said composite structure being applied in a manner such that said polyfluorocarbon is adjacent said wire, said coated wire being especially useful in electrical applications.

11. A film comprising the composite structure of claim 1 and which is especially useful in electrical applications.

12. A composite structure of claim 1 wherein R is

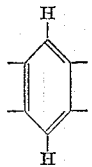

13. A composite structure of claim 1 where R is

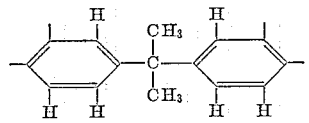

14. A composite structure of claim 1 wherein R is

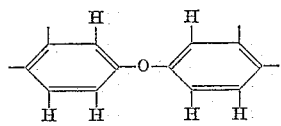

15. A composite structure of claim 1 wherein R' is biphenyl-4,4'-ylene.

16. A composite structure of claim 1 wherein R' is 2,2-bis(phenyl-4-yl)propane.

17. A composite structure of claim 1 wherein R' is bis(phenyl-4-yl)methane.

18. A composite structure of claim 1 wherein R' is bis(phenyl-4-yl)ether.

19. A composite structure of claim 1 wherein R' is 4,4-dimethylheptamethylene.

20. In a process for the formation of a duplex composite structure, one component of which is a polyimide which has been formed from a solution of a polyamide acid, said polyamide acid having an inherent viscosity at 30° C. as a 0.5% solution in N,N-dimethylacetamide of 0.3–5, the steps which comprise exposing the surface of a polyfluorocarbon substrate to a corona discharge so as to activate it to make the polyimide adherable to it, contacting said treated surface with the solution of a polyamide acid and converting said polyamide acid to said polyimide.

21. In a process for the formation of a duplex composite structure, one component of which is a polyimide which has been formed from a solution of a polyamide acid, said polyamide acid having an inherent viscosity at 30° C. as a 0.5% solution in N,N-dimethylacetamide of 0.3–5, the steps which comprise exposing the surface of a polyfluorocarbon substrate to an alkali-metal etching reagent so as to activate it to make the polyimide adherable to it, contacting said treated surface with the solution of a polyamide acid and converting said polyamide acid to said polyimide.

22. In a process for the formation of a duplex composite structure, one component of which is a polyimide which has been formed from a solution of a polyamide acid, said polyamide acid having an inherent viscosity at 30° C. as a 0.5% solution in N,N-dimethylacetamide of 0.3–5, the steps which comprise coating a polyfluorocarbon substrate with a layer of a tetrafluoroethylene-hexafluoropropylene copolymer containing at least 5 wt. percent hexafluoropropylene units, exposing the surface of said copolymer layer to a corona discharge so as to activate it to make the polyimide adherable to it, contacting said treated surface with the solution of a polyamide acid and converting said polyamide acid to said polyimide.

23. In a process for the formation of a duplex composite structure, one component of which is a polyimide which has been formed from a solution of a polyamide acid, said polyamide acid having an inherent viscosity at 30° C. as a 0.5% solution in N,N-dimethylacetamide of 0.3–5, the steps which comprise coating a polyfluorocarbon substrate with a layer of a tetrafluoroethylene-hexafluoropropylene copolymer containing at least 5 wt. percent hexafluoropropylene units, exposing the surface of said copolymer layer to an alkali-metal etching reagent so as to activate it to make the polyimide adherable to it, contacting said treated surface with the solution of a polyamide acid and converting said polyamide acid to said polyimide.

24. An electrical conductor having an insulating layer of a perfluorocarbon polymer and a layer of a heterocyclic polymeric imide directly bonded to and surrounding said perfluorocarbon polymer layer, said polymeric imide being selected from the group consisting of compounds having a member of the group consisting of benzene and naphthalene rings joined to two carbon atoms of a heterocyclic imide ring having 5 to 6 members in the ring, one to two of the atoms of the heterocyclic ring being nitrogen atoms and the balance of the atoms of the heterocyclic ring being carbon atoms.

25. An electrical conductor according to claim 24 wherein said perfluorocarbon polymer is selected from the group consisting of polytetrafluoroethylene, polyhexafluoropropylene and tetrafluoroethylene-hexafluoropropylene copolymers.

26. An electrical conductor having an insulating layer of a perfluorocarbon polymer of the group consisting of polytetrafluoroethylene, polyhexafluoropropylene and tetrafluoroethylene-hexafluoropropylene copolymers and a layer of a heterocyclic polymeric imide having a member of the group consisting of benzene and naphthalene rings joined to 2 carbon atoms of a heterocyclic ring having 5 carbon atoms in the heterocyclic ring directly bonded to and surrounding said perfluorocarbon polymer.

27. An electrical conductor according to claim 26 wherein said polymeric imide is a polybenzimidazole.

28. An electrical conductor according to claim 26 wherein the polymeric imide is a poly pyromellitimide.

29. An electrical conductor according to claim 26 wherein the surface of the fluorocarbon polymer which contacts the polymeric imide is in an etched condition.

References Cited

UNITED STATES PATENTS

| | | | |
|---|---|---|---|
| 2,421,024 | 5/1947 | Frosch | 260—78 |
| 2,833,686 | 5/1958 | Sandt. | |
| 2,867,609 | 1/1959 | Edwards et al. | 260—78 |
| 2,911,328 | 11/1959 | Goldsmith | 117—75 X |
| 2,940,869 | 6/1960 | Graham. | |
| 2,955,958 | 10/1960 | Brown | 117—113 |
| 2,957,077 | 10/1960 | Hay | 250—49.6 |

ALFRED L. LEAVITT, *Primary Examiner.*

MURRAY KATZ, WILLIAM D. MARTIN, RICHARD D. NEVIUS, *Examiners.*

H. E. COLE, W. L. JARVIS, *Assistant Examiners.*